United States Patent [19]

Dyer

[11] Patent Number: 4,921,340

[45] Date of Patent: May 1, 1990

[54] AUXILIARY MIRROR ASSEMBLY FOR VEHICLES

[76] Inventor: William B. Dyer, 3358 Taylor Rd., Central Point, Oreg. 97502

[21] Appl. No.: 218,878

[22] Filed: Jul. 14, 1988

[51] Int. Cl.⁵ .......................... G02B 7/18; G02B 5/10; B60R 1/08
[52] U.S. Cl. .................................... 350/631; 350/626; 350/612; 350/606; 248/475.1
[58] Field of Search ............... 350/625, 626, 627, 612, 350/606, 631, 632; 248/425.1

[56] References Cited

U.S. PATENT DOCUMENTS

| | | | |
|---|---|---|---|
| 4,025,173 | 5/1977 | Schmaedeke | 350/304 |
| 4,208,104 | 6/1980 | Peterson | 350/304 |
| 4,664,489 | 5/1987 | Karns | 350/631 |
| 4,674,849 | 6/1987 | Stewart | 350/612 |

FOREIGN PATENT DOCUMENTS

| | | | |
|---|---|---|---|
| 2108953 | 8/1972 | Fed. Rep. of Germany | 350/304 |
| 2325014 | 12/1974 | Fed. Rep. of Germany | 350/625 |
| 1416590 | 9/1965 | France | 350/626 |
| 1202646 | 8/1970 | United Kingdom | 350/606 |
| 2177985 | 2/1987 | United Kingdom | 350/625 |

*Primary Examiner*—Jon W. Henry
*Attorney, Agent, or Firm*—James D. Givnan, Jr.

[57] ABSTRACT

A mirror assembly having a two piece bracket for clamped attachment to the ends of an original equipment side view mirror. A first bracket component is bifurcated to engage a mirror arm and is fastened to a second bracket component which includes tabs which seat against the outer end of the original mirror. A mirror is carried by the second bracket component.

5 Claims, 1 Drawing Sheet

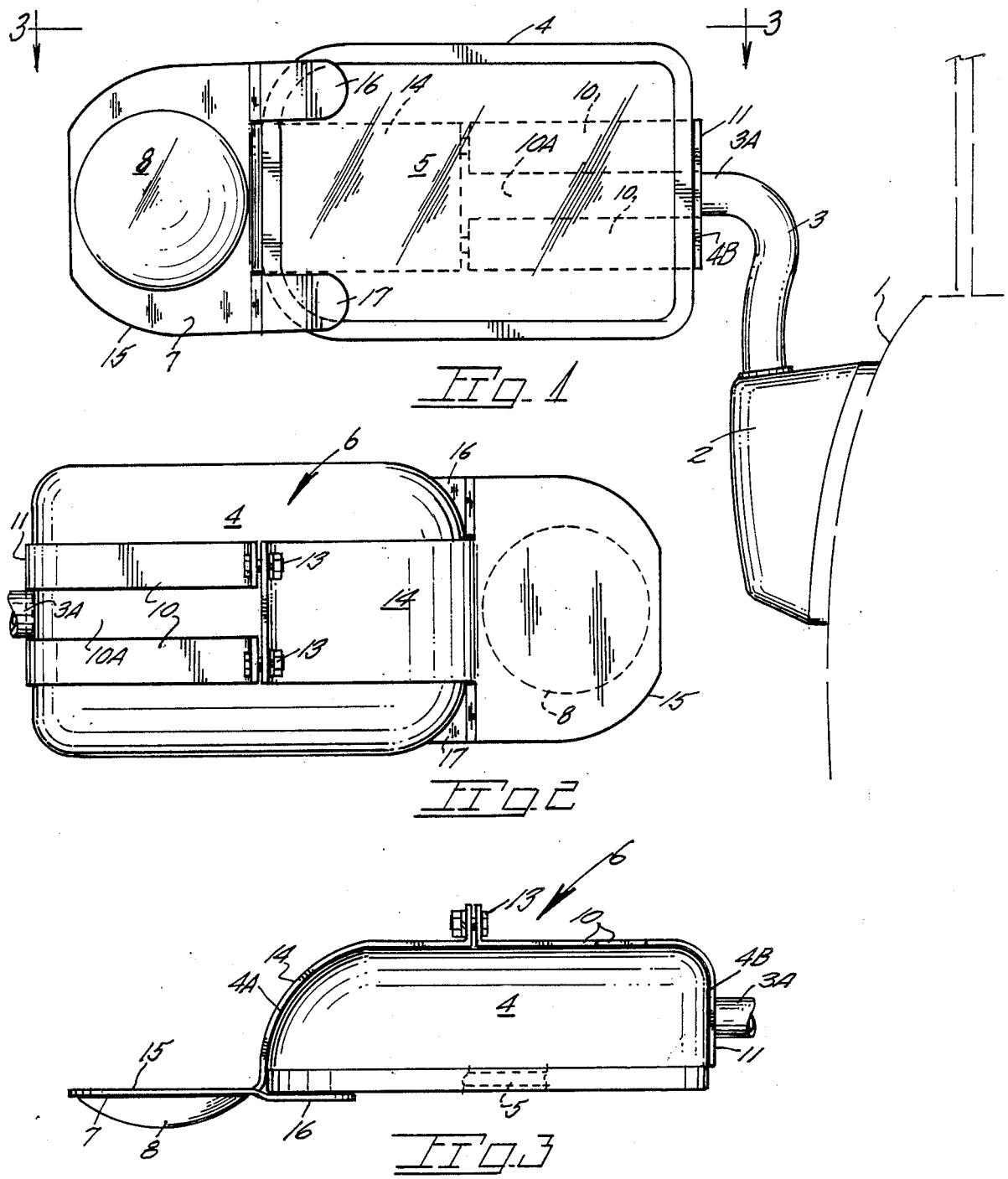

AUXILIARY MIRROR ASSEMBLY FOR VEHICLES

BACKGROUND OF THE INVENTION

The present invention concerns generally an attachment for an exterior vehicle mirror of the type mounted on the vehicle door or adjacent thereto.

Current side view mirrors for some makes of automobiles are generally rectangular with an elongate, streamlined housing. Such mirrors normally provide adequate viewing rearwardly of one side of the vehicle, but do not provide an adequate range of vision when towing a trailer. Accordingly, the side view mirror must be adjusted in a compromised manner resulting in a blind spot either adjacent the side of the trailer or in an adjacent traffic lane used by passing vehicles. Certain types of auxiliary mirrors have been proposed for side view mirrors but are not suitable for attachment to current side view mirrors. One proposed reason is that known auxiliary mirrors require modification of the original equipment mirror which vehicle owners are reluctant to do. Secondly, some auxiliary side view mirrors utilize a number of tubular components which are cumbersome and detract from the vehicles appearance.

The introduction of streamlined mirror housings has resulted in complicating the addition of an auxiliary mirror since such housings lack flat surfaces to which an auxiliary mirror may be secured. While such housings could be permanently modified for a side view mirror, such is unacceptable since such modifications would be unsightly when the towing operation is finished and the auxiliary mirror removed.

SUMMARY OF THE PRESENT INVENTION

The present invention is embodied within an auxiliary mirror for removable attachment to a streamlined mirror housing.

The present attachment includes a base adapted for engagement with the housing of an original equipment side view mirror and protrudes outwardly therefrom to support the auxiliary mirror. The base includes a bracket for placement about a housing support arm. A bracket extension includes a curved component of the base which projects outwardly in a curved manner to locate the auxiliary mirror substantially coplanar with the vehicle side view mirror. Tabs on the base engage a frame of the original equipment mirror. The present auxiliary mirror may be installed in a do-it-yourself manner with basic hand tools without modification to the vehicle mirror.

Important objectives of the present invention include an auxiliary side view mirror which provides an expanded field of rearward vision along one side of a vehicle and a trailer which mirror is conveniently attached to permit installation and removal with a minimum effort; the provision of an auxiliary side view mirror which may be securely mounted to the original equipment side view mirror housing without modification of same; the provision of an auxiliary side view mirror of simple construction with a low cost of manufacture.

BRIEF DESCRIPTION OF THE DRAWINGS

In the accompanying drawings:

FIG. 1 is a rear elevational view of an original equipment mirror of a vehicle equipped with the present auxiliary mirror;

FIG. 2 is a front elevational view thereof; and

FIG. 3 is a top plan view of FIG. 1 taken along line 3—3 thereof.

DETAILED DESCRIPTION OF THE PREFERRED EMBODIMENTS

With continuing attention to the drawings wherein applied reference numerals indicate parts similarly hereinafter identified, the reference numeral 1 indicates the side of an automobile body such as a vehicle door.

A mirror mount at 2 in place on the vehicle body supports an arm 3 which has a horizontal segment 3A which terminates within a mirror housing at 4. Housing 4 includes a curved frontal (relative to the vehicle) wall shaped for streamlining purposes to reduce drag. A side view mirror is at 5. The foregoing is intended to be a description of a typical side view mirror.

The present auxiliary mirror assembly includes a base indicated generally at 6 including a mirror supporting surface at 7 with a mirror 8 thereon. Mirror 8 is substantially coplanar with the side view mirror 5 and may be of convex shape.

With attention to base 6, the same includes a bifurcated first bracket component 10 with a flange 11 which seats about side view mirror arm 3. The bracket component 10 is adapted, by means of fasteners 13, to support the remainder of said base, namely a curved second bracket component at 14 which extends outwardly and thence rearwardly (relative to the vehicle) terminating in a mirror support 15 having mirror supporting surface 7 thereon.

Bracket component 14 is formed with tabs at 16 and 17 which project inwardly from mirror support surface 7 toward the vehicle to overlie upper and lower extremities of the mirror housing 4. As viewed in FIG. 3, the tabs 16 and 17 may be angled somewhat to enhance retention with mirror housing 4. It will be understood that the tabs may be of a different size and shape shown so as to be compatible with mirror housing configuration which will, of course, vary between makes and models of vehicles. Further if so desired, the present mirror assembly may be provided with resilient material to both enhance securement to the original equipment mirror as well as avoid metal-to-metal contact therewith for purposes of noise reduction.

In use, bracket 10 which defines a curved elongate opening 10A is slipped into place in straddled engagement with arm segment 3A with the fastener assemblies 13 applied to couple bracket component 14 to curved bracket component or extension 10 in a biased manner whereat tabs 16 and 17 on the latter firmly engage the outer end of mirror assembly housing 4. Bracket component 14 will also be urged into surfacial engagement with a curved end 4A of the housing while flange 11 will abut a flat wall end 4B of the housing.

While I have shown but one embodiment of the invention, it will be apparent to those skilled in the art that the invention may be embodied still otherwise without departing form the spirit and scope of the invention.

Having thus described the invention, what is desired to be secured by a Letters Patent is:

I claim:

1. An auxiliary mirror assembly for attachment to an arm supported permanent side view mirror assembly of a vehicle, said auxiliary mirror assembly including a mirror housing having opposite ends, said auxiliary mirror assembly comprising, a base including bracket components for opposed abutting engagement with said opposite ends of the permanent side view mirror assembly, one of said components including a mirror supporting surface and tabs, said tabs for overlying engagement with said housing, said mirror supporting surface offset from one of said ends of the mirror housing, the other of said components being of bifurcated configuration and including a flange for retentive engagement with the arm of the permanent mirror assembly, means adapted for urging said bracket components into biased engagement with said opposite ends of the permanent side view mirror assembly.

2. The mirror assembly claimed in claim 1 wherein said bracket components are curved to overlie in surfacial contact with said mirror housing, said means including fastener assemblies coupling said bracket components to one another.

3. An auxiliary mirror assembly for attachment to an arm supported elongate housing of a permanent side view mirror assembly of a vehicle, said auxiliary mirror assembly comprising, a base including first and second bracket components each shaped to overlie and surfacially engage portions of said elongate housing for endwise abutting engagement with the opposite ends of said elongate housing, said first bracket component bifurcated for straddled engagement with said arm of the permanent side view mirror assembly, said second bracket component including a mirror supporting surface offset from one of said ends of the elongate housing, and means for biasing said bracket components toward one another and into said endwise abutting engagement with said elongate housing of said side view mirror assembly.

4. The auxiliary mirror assembly claimed in claim 3 wherein said second bracket component includes a curved portion to locate the mirror supporting surface substantially coplanar with the mirror of said permanent side view mirror assembly.

5. The auxiliary mirror claimed in claim 3 wherein said second bracket component terminates in spaced apart tabs and said mirror supporting surface, said tabs adapted to overlie portions of the permanent side view mirror assembly, said tabs substantially coplanar with and oppositely spaced from said mirror supporting surface of said first bracket component.

* * * * *